(12) United States Patent
Ahrens et al.

(10) Patent No.: US 8,285,533 B2
(45) Date of Patent: Oct. 9, 2012

(54) DIRECTED ENERGY WEAPON DEPLOYMENT SIMULATION

(75) Inventors: Frederick A. Ahrens, Tucson, AZ (US); Daniel L. McMaster, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1104 days.

(21) Appl. No.: 12/124,780

(22) Filed: May 21, 2008

(65) Prior Publication Data
US 2012/0232867 A1    Sep. 13, 2012

Related U.S. Application Data (60) Provisional application No. 60/940,268, filed on May 25, 2007.

(51) Int. Cl.
*G06F 17/50* (2006.01)
*G01S 7/42* (2006.01)
*G01S 13/00* (2006.01)

(52) U.S. Cl. ................ 703/13; 342/20; 342/62

(58) Field of Classification Search ............ 703/13, 703/20; 342/13, 17, 20, 62, 90
See application file for complete search history.

(56) References Cited

U.S. PATENT DOCUMENTS

| | | | | |
|---|---|---|---|---|
| 5,960,097 | A | * | 9/1999 | Pfeiffer et al. ............ 382/103 |
| 2001/0027389 | A1 | * | 10/2001 | Beverina et al. ............ 703/22 |
| 2004/0219491 | A1 | * | 11/2004 | Shlomo ............ 434/11 |
| 2005/0275582 | A1 | * | 12/2005 | Mohan ............ 342/13 |

OTHER PUBLICATIONS

Raytheon, "Silent Guardian," Jun. 2006.
Wikipedia, "Active Denial System Description," May 1, 2007.
Raytheon, "Vigilant Eagle Airport Protection System" Brochure, 2005.

* cited by examiner

*Primary Examiner* — Kandasamy Thangavelu
*Assistant Examiner* — Andre Pierre Louis
(74) *Attorney, Agent, or Firm* — Schwegman Lundberg & Woessner, P.A.

(57) ABSTRACT

Methods, apparatus, and computer readable media for designing an effective and efficient directed energy weapon system. A method for designing a directed energy weapons system may include modeling an environment and postulating a directed energy weapons system deployment. The capability of the postulated directed energy weapon system deployment to defend a target aircraft against a missile threat within the environment may then be simulated. The postulated directed energy weapon system deployment may be iteratively improved based on simulation results.

18 Claims, 11 Drawing Sheets

DIRECTED ENERGY WEAPON DEPLOYMENT SIMULATION

RELATED APPLICATION INFORMATION

This application claims benefit under 35 U.S.C. §119(e) of the filing date of provisional patent application Ser. No. 60/940,268, filed May 25, 2007, entitled VIGILANT EAGLE DEPLOYMENT SIMULATION. This application is related to application Ser. No. 11/940,425, filed Nov. 15, 2007, entitled System and Method for Diverting a Guided Missile, now U.S. Pat. No. 7,961,133; Ser. No. 11/423,520, filed Jun. 12, 2006, entitled Anti-Missile System and Method, now U.S. Pat. No. 7,504,982; Ser. No. 11/875,131, filed Oct. 19, 2007, entitled RF Waveform Modulation Apparatus and Method, now U.S. Pat. No. 7,865,152; and Ser. No. 11/821,760, filed Jun. 24, 2007, entitled High Power Phased Array antenna System and Method with Low Power Switching, now U.S. Pat. No. 7,791,536.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to directed energy weapons.

2. Description of the Related Art

Shoulder-launched missiles, commonly termed man-portable air defense systems (MANPADS), were initially developed to provide military ground forces with a defense against enemy aircraft. However, MANPADS missiles are now widely available and are considered a significant threat for terrorist attacks against civilian aircraft.

High power directed energy weapons, including high power microwave (HPM) weapons and laser weapons, are a candidate defense against MANPADS attacks.

DETAILED DESCRIPTION

Figure 1:
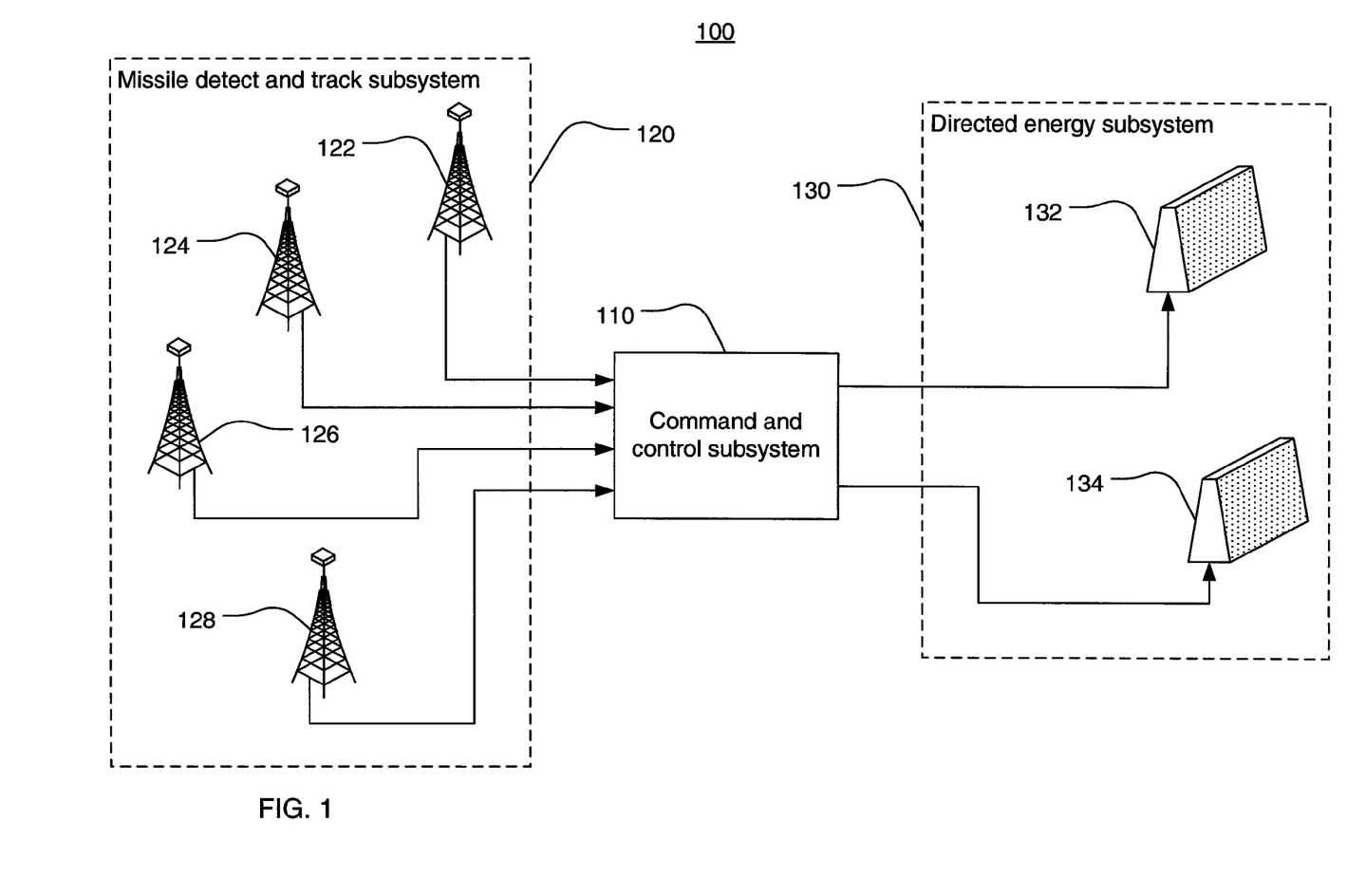
FIG. 1 is a block diagram of a directed energy weapon system.

Referring now to FIG. 1, an exemplary counter-MANPADS directed energy weapon (DEW) system 100 may include a missile detect and track (MDT) subsystem 120, a command and control (C2) subsystem 110, and a directed energy subsystem 130. The directed energy subsystem 130, as illustrated in the example of FIG. 1, may be a high power microwave subsystem. Within this description, a MANPAD missile will be referred to as the threat, and an aircraft under attack by the MANPAD threat will be referred to as the target. The DEW system 100 may be designed to protect targets from threats within a volume of space, herein termed the "protected volume", which may include all anticipated target locations. The protected volume may include, for example, the region surrounding the ingress and egress routes from an airport from ground level to an altitude of 20,000 feet.

The MDT subsystem 120 may include a plurality of passive sensors. While FIG. 1 shows four passive sensors 122-128, an actual deployed MDT subsystem may include fifty or more passive sensors. Each passive sensor 122-128 may have a predetermined field of regard, or solid angular range, over which the passive sensor is effect to detect and track threats. Each passive sensor 122-128 may have an effective range for the detection of threats. The passive sensors 122-128 may be mounted as high as practical above ground level to ensure minimum obstruction of the field of regard of each sensor. The passive sensors 122-128 may be mounted on towers, as depicted in FIG. 1, which may be runaway approach light towers, cell phone antenna towers, utility poles, or other towers. The passive sensors 122-128 may also be mounted on buildings, bridges, and other structures.

The quantity and disposition of the plurality of passive sensors may be such that every point in the protected volume is within the field of regard and effective range of at least two passive sensors, such that triangulation can be used to locate and track threats. For example, each passive sensor that detects and tracks a specific threat may provide data, such as azimuth and elevation angles, of a vector from the passive sensor to the threat. The intersection of the vectors from two or more passive sensors may define the location of the target, subject to the resolution and accuracy of the passive sensors. Tracking the target with three or more passive sensors may allow the target position to be tracked with greater accuracy.

Various processing and filtering techniques may be applied to the data provided by the plurality of passive sensors 122-128 to refine the threat tracks, and to distinguish legitimate MANPADS threats and other threats from non-threatening objects that may be detected. The processing and filtering of the data provided by the plurality of passive sensors 122-128 may be performed within the MDT subsystem 120 or within the C2 subsystem 110.

The C2 subsystem 110 may receive threat tracking information from the MDT subsystem 120, and may provide pointing commands to the direct energy subsystem 130. The C2 subsystem may also interface with existing sensor systems, such as radar systems used for tracking aircraft approaching and departing an airport, and security infrastructures.

The directed energy subsystem may include one or more directed energy sources 132-134. Each directed energy source may have a field of regard and an effective main beam radiated power. The maximum effective range for each directed energy source may depend on the main beam radiated power, the threat type, and the threat aspect angle. The number and disposition of the directed energy sources may be such that every point in the protected volume is within the field of regard and effective range of at least one directed energy source. Upon receipt of pointing commands, one or more of the directed energy sources 132-134 may generate and direct one or more beam of energy to impact and disrupt the operation of the threat. The beam of energy may be a high power microwave beam generated by one or more electronically steered active array antennas 132/134, as shown in the example of FIG. 1. The beam of energy may be a laser beam or other high power beam capable of disrupting the operation of the threat.

In addition to providing pointing commands to the directed energy subsystem, the C2 subsystem may track, or receive tracking information for, the target aircraft and other parties that lie along the path of the directed energy beam or beams. The other parties may include the target aircraft, other aircraft, and entities on the ground including personnel, vehicles, and structures. The C2 subsystem may provide commands to the directed energy subsystem to take action to mitigate risks to the other parties. For example the C2 subsystem may command the directed energy subsystem to interrupt the directed energy beam, to defocus the directed energy beam, or to reduce the power of the directed energy beam to avoid potential damage or to mitigate other risks to other parties.

Description of Processes

Figure 2:
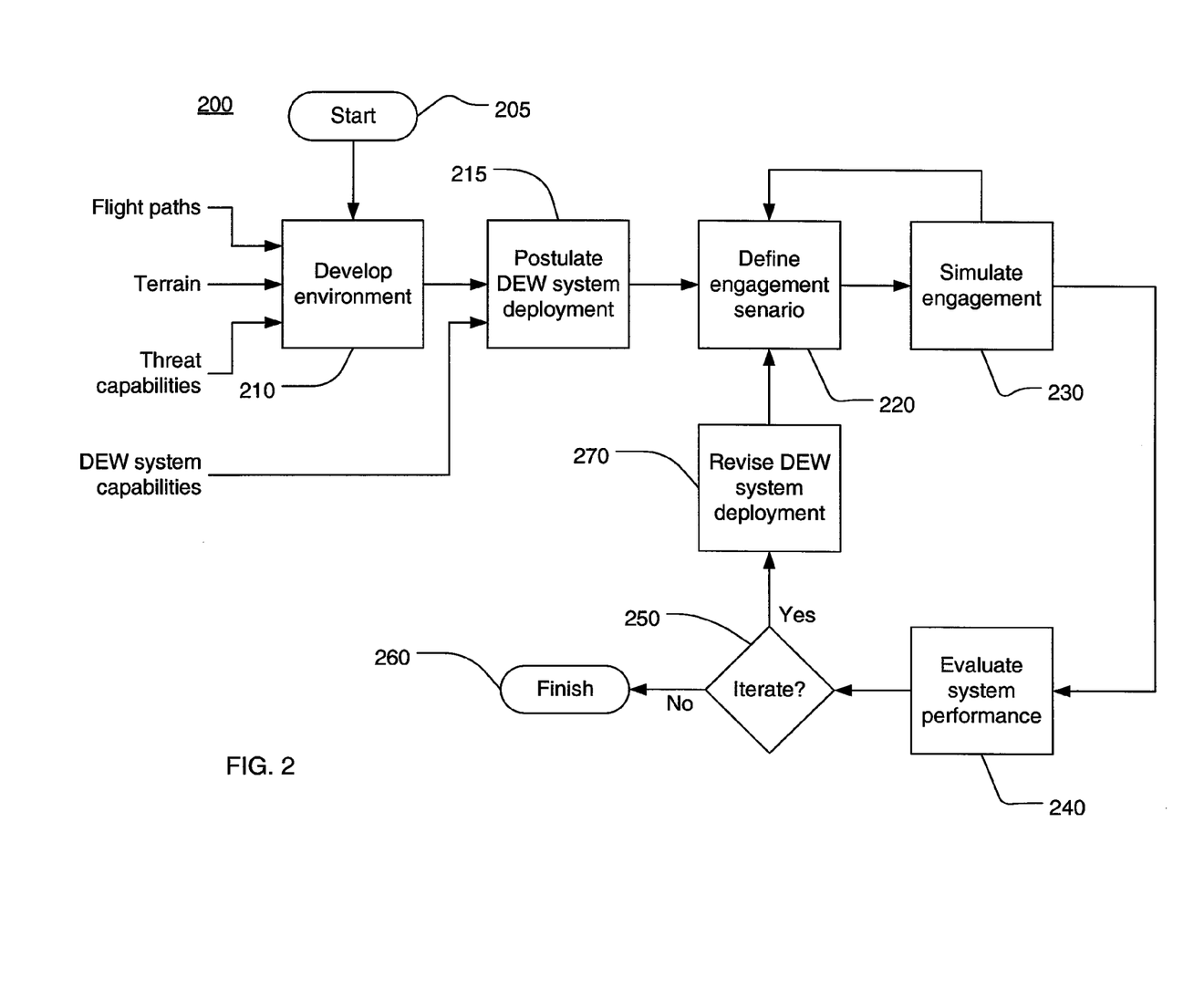
FIG. 2 is a flow chart of a process for designing a directed energy weapon system deployment.

Referring now to FIG. 2, a process 200 for designing a DEW system may start at 205 and may include developing an environment 210, postulating a DEW system deployment 215, defining at least one engagement scenario 220, and simulating the engagement 230. The process 200 may employ Monte Carlo techniques in which a large plurality of engagement scenarios, each including at least some randomly-selected parameters, may be defined and simulated. Thus defining an engagement scenario 220 and simulating the engagement 230 may be repeated cyclically until a desired total number of engagements has been simulated.

After the total number of engagements has been simulated, the DEW system performance may be evaluated 240. The evaluation may include, for example, development of statistical measures indicating the percentage of successful and unsuccessful simulated engagements against single and multiple MANPADS threats. The evaluation may also include the development of maps indicating the launch points and/or flight paths of the MANPADS threats that were not successfully engaged. Such maps may be used to identify gaps in the defense provided by the postulated DEW system, and may provide guidance on how to adjust the deployment to close the gaps.

At 250, a determination may be made whether the postulated DEW system deployment meets predetermined performance objectives. If the postulated DEW system deployment meets its objectives, the process 200 may terminate at 260. If the postulated DEW system does not meet its objectives, the DEW system deployment may be revised 270 based on the system performance evaluation 240. Revisions to the postulated DEW system deployment may be made by an operator or engineer using a graphical interface to the simulation system or other method. Revisions to the postulated DEW system deployment may be made automatically in response to identified gaps in the prior DEW system deployment. The process from 220 to 270 may be iterated until a DEW system design meeting the performance objectives is established.

Figure 3:
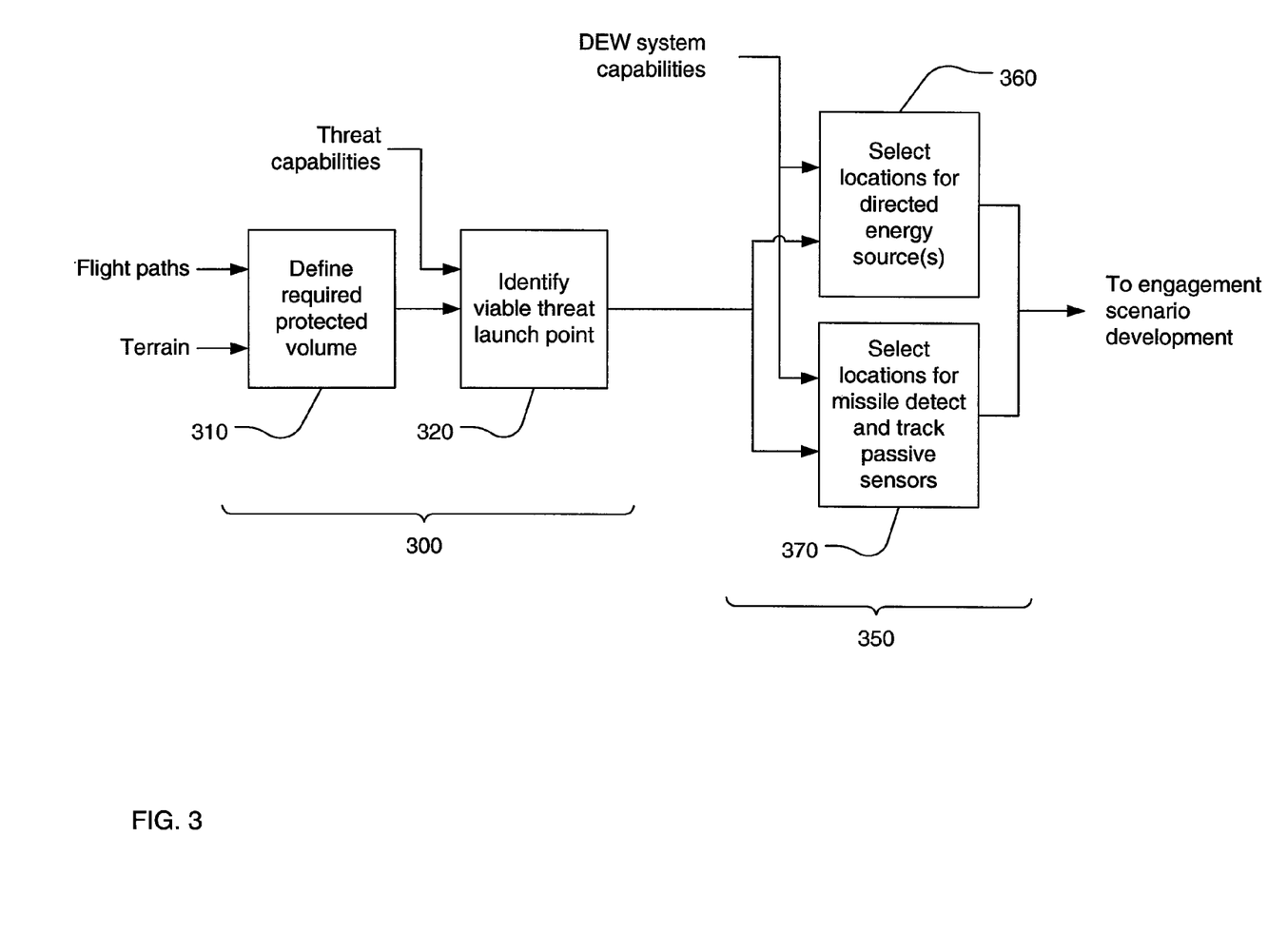
FIG. 3 is a flow chart of processes for defining a environment and for postulating a directed energy weapon system deployment.

Referring now to FIG. 3, a process 300 for developing an environment, which may be suitable for 210 in FIG. 2, may include defining a required protected volume 310 and identifying all viable threat launch points 320. The process 300 will be illustrated through the example of FIGS. 4A-B, which show progressive stages of the development of an environment for deployment of a directed energy weapon. Note that FIGS. 4A-D show a top-down two-dimensional view of a three-dimensional environment, and that various portions of the three-dimensional environment may include altitude ranges above ground level.

Figure 4A:
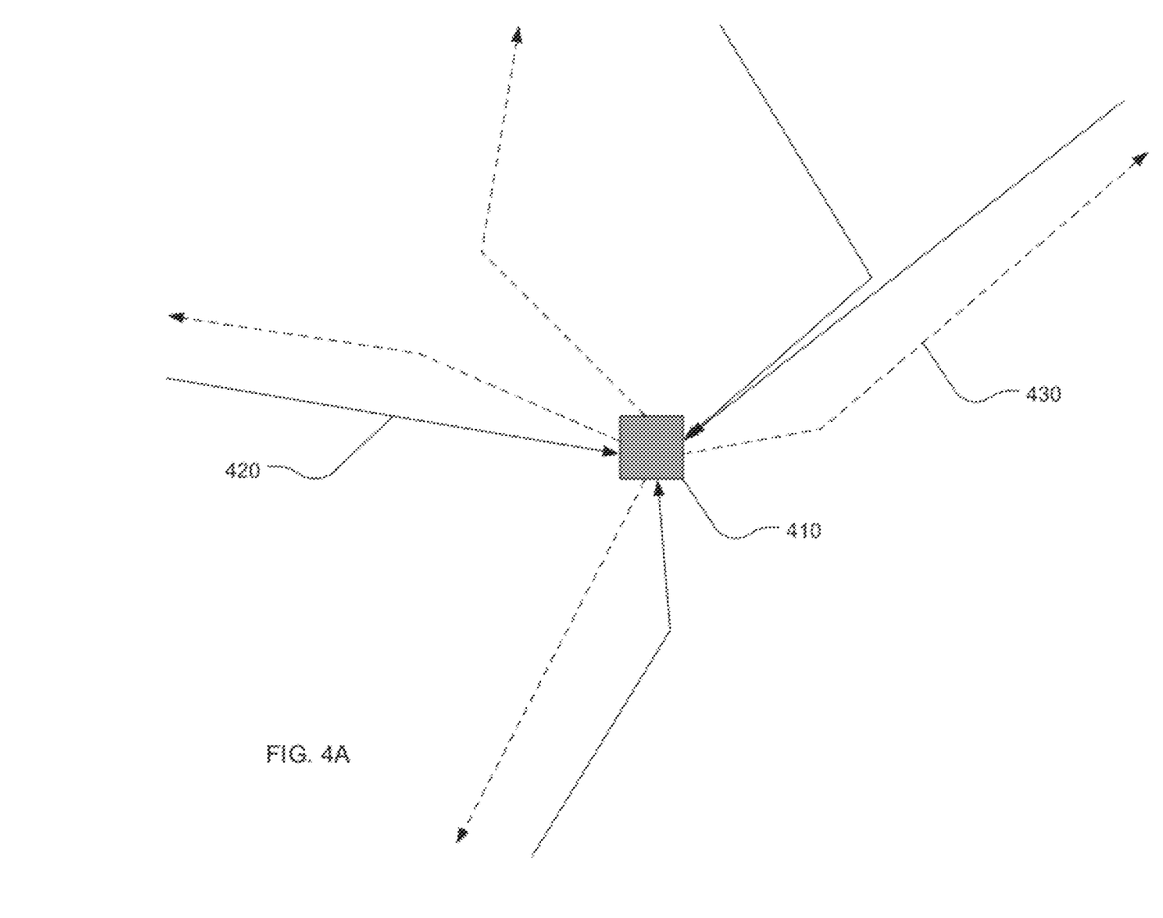
FIG. 4A is a partial representation of a directed energy weapon system deployment environment.

First, the process 300 for developing an environment may include defining the required protected volume 310. As shown in FIG. 4A, an exemplary protected environment may be the airspace surrounding an airport 410. In particular, the protected environmental may be defined to include the airspace surrounding the standard routes or corridors used by aircraft approaching the airport 410 (such as solid line 420) and the standard routes or corridors used by aircraft departing the airport 410 (such as dashed line 430). Note that FIG. 4A is exemplary and not based on any particular airport.

Figure 4B:
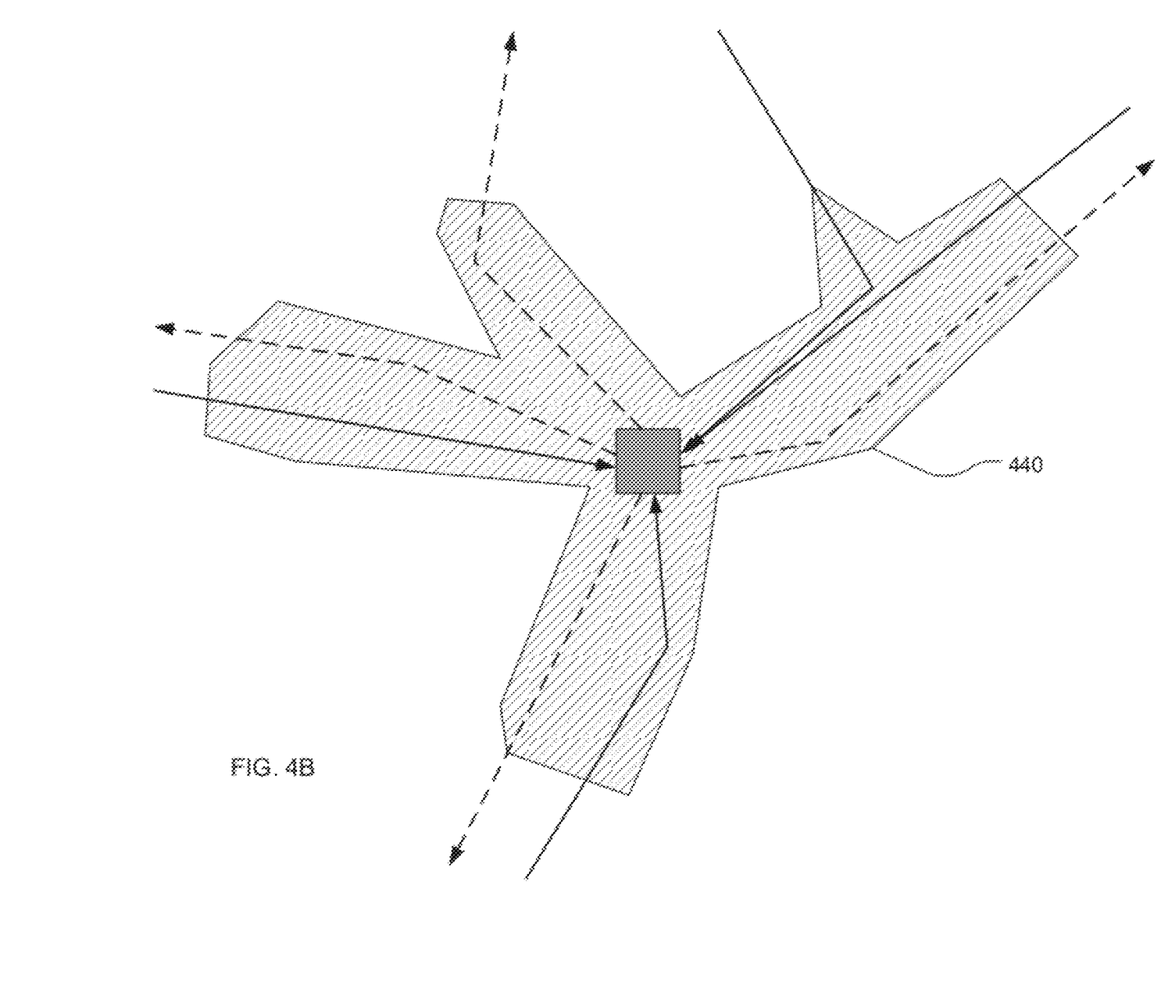
FIG. 4B is a partial representation of a directed energy weapon system deployment environment.

The process 300 for developing an environment may continue by identifying all viable threat launch points 320, where a viable threat launch point is any location were a threat can be launched to attack a target within the protected volume. Each type of MANPADS threat has a finite effective range. For a given threat type, each viable launch point may be within the threat's effective range of at least some portion of the protected volume. Since different types of MANPADS threats may have different effective ranges, the distribution of viable launch points may be different for different types of threats. FIG. 4B shows a threat area 440 which may include all of the viable launch points for all anticipated MANPADS threats. The area 440 is simplified in that the possible effects of masking due to terrain features and structures has not been illustrated. In a real deployment, the threat area may be a plurality of irregular and discontinuous sub-areas that may fit within the threat area 440 shown in FIG. 4B.

After the protected volume and the threat area are defined, a process 350 for postulating a DEW system deployment, which may be suitable for 215 in FIG. 2, may include selecting locations for directed energy sources 360, and selecting locations for missile detect and track passive sensors 370. The process 350 will be illustrated through the example of FIGS. 4C-D, which show additional stages of the development of a deployment of a directed energy weapon.

Figure 4C:
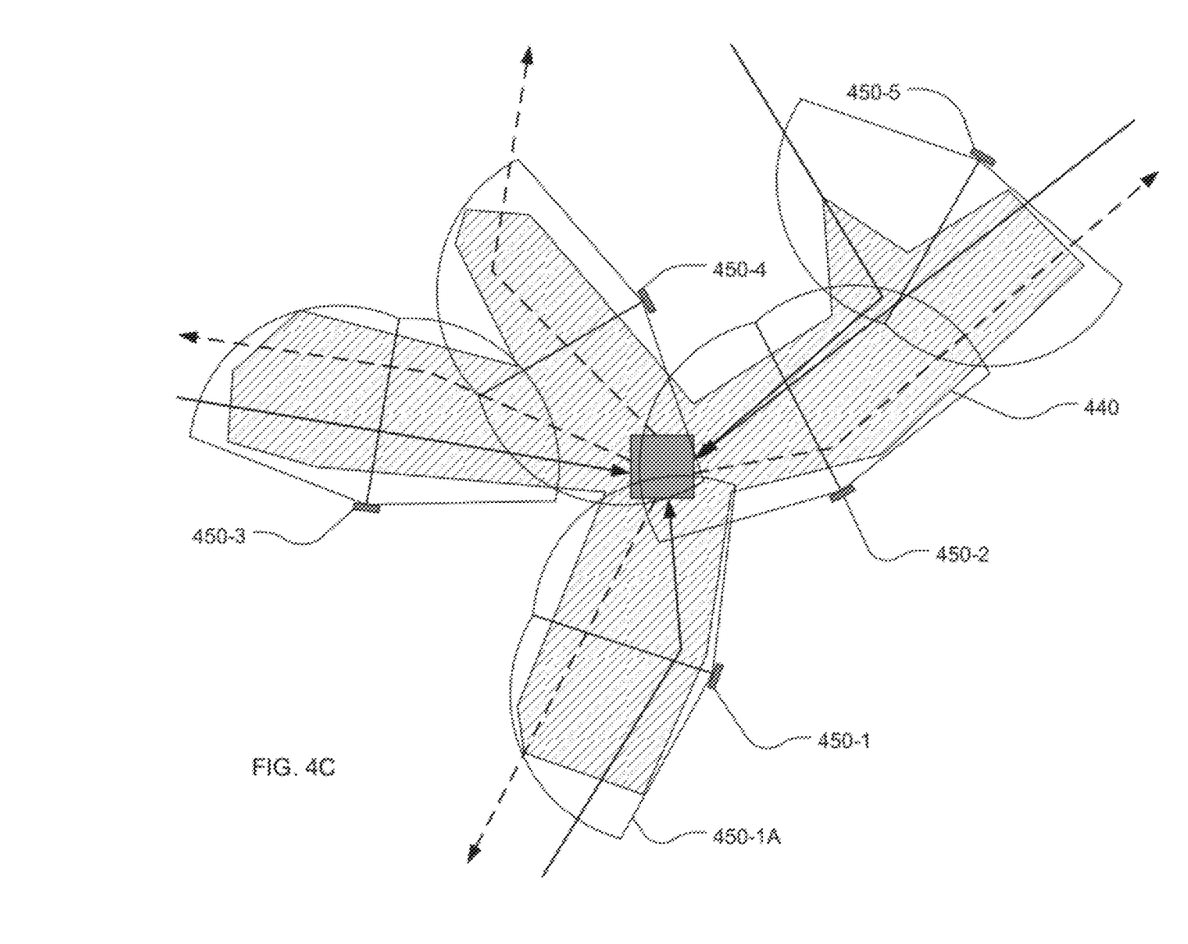
FIG. 4C is a partial representation of a directed energy weapon system deployment environment.

At 360, the locations of the directed energy sources may be selected such that every possible threat track is with the field of regard and effective range of at least one directed energy source. In this context, a threat track is defined as a path from a viable threat launch point to a target location within the protected volume. By way of example, FIG. 4C shows the locations of five directed energy sources 450-1 to 450-5. The field of regard and effective range of each directed energy source is indicated by a lobed antenna pattern, of which only antenna pattern 450-1A is identified. The five directed energy sources 450-1 to 450-5 are disposed such that the entire threat area 440 is covered by the antenna pattern of at least one directed energy source. The selection of the locations of the five directed energy sources 450-1 to 450-5 is an example, and numerous other combinations of locations are possible.

Figure 4D:
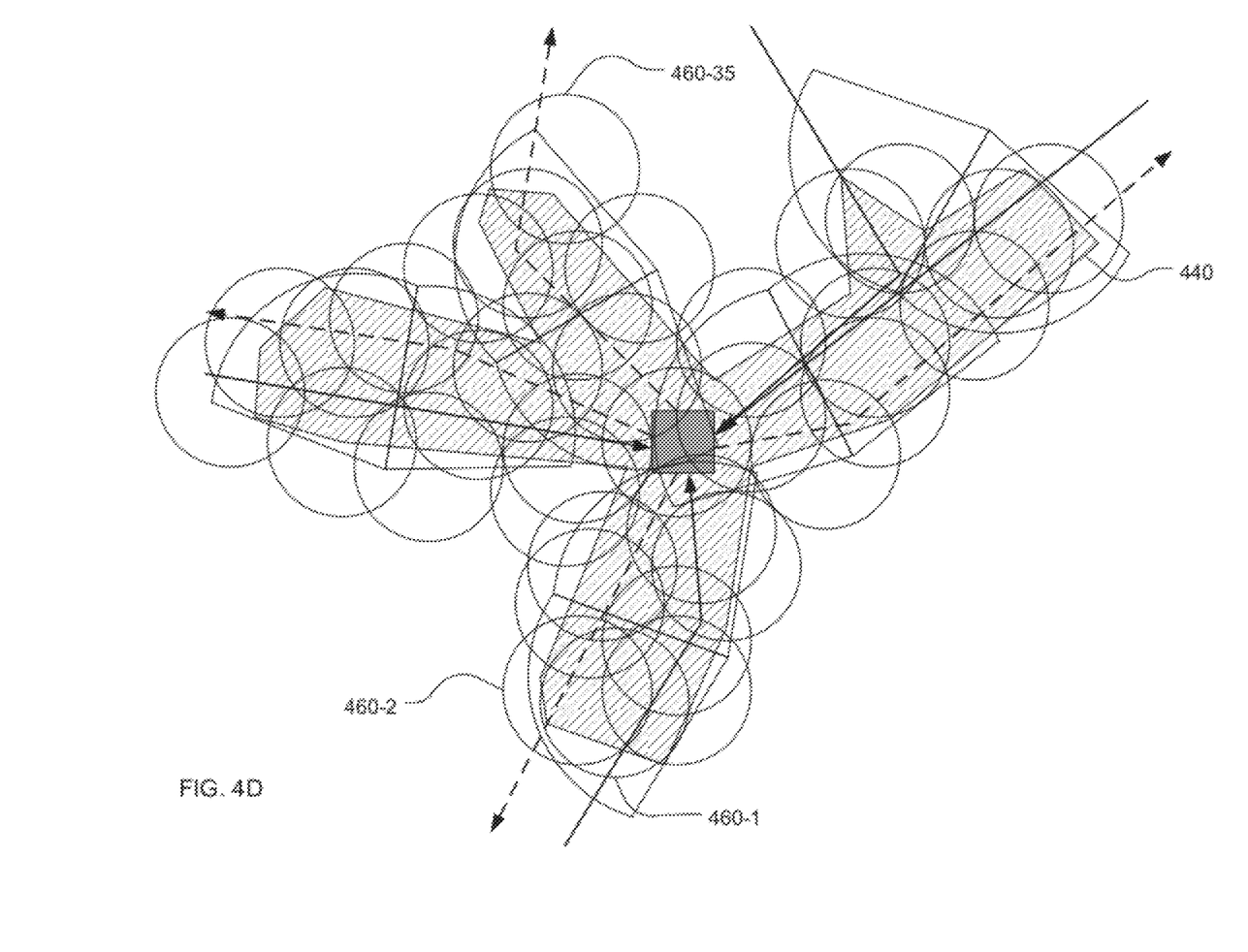
FIG. 4D is a representation of a directed energy weapon system deployment environment.

The selection of locations for passive sensors 370 may be done before, after, or concurrent with the selection of locations for the directed energy sources at 360. The locations of the passive sensors may be selected such that every possible threat track is with the field of regard and detection range of at least two passive sensors. By way of example, FIG. 4D shows the coverage of thirty-five passive sensors 460-1 to 460-35, of which only 460-1, -2, and -35 are identified. The field of regard and effective range of each passive sensor is indicated by a circle. The thirty-five passive sensors 460-1 to 460-35 are disposed such that the entire threat area 440 is covered by at least two passive sensors. The selection of the quantity and locations of the passive sensors 460-1 to 460-35 is an example, and numerous other combinations are possible.

Figure 5:
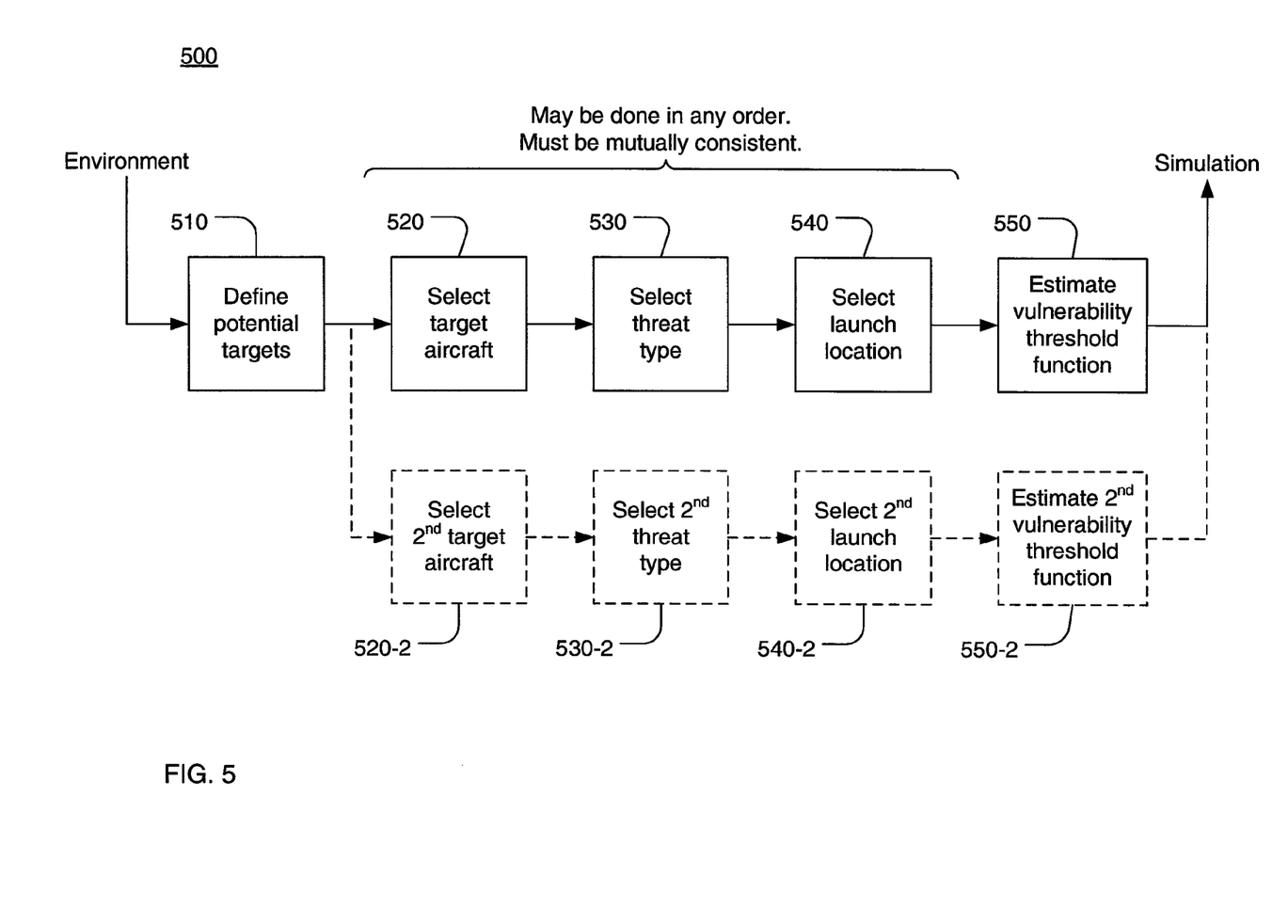
FIG. 5 is a flow chart of a process for defining an engagement scenario.

After an environment is developed using a process such as the process 300 and DEW system deployment is postulated using a process such as the process 350, at least one engagement may be defined using a process such as the process 500 shown in FIG. 5. At 510, a population of potential targets may be defined. In case of a directed energy weapon deployment to protect flights into and out of an airport, as in the example of FIGS. 4A-4D, potential targets may be randomly placed on the arriving and departing flight paths consistent with the rules for inter-aircraft spacing. Alternately, a specific date and time may be selected and the flight paths may be populated using historical data.

At 520, a single target aircraft may be selected, randomly or by some criteria, from the population of potential targets. At 530, a threat missile type may be selected. The threat type may be selected randomly with the results weighted to reflect the availability of various threat types. The threat type may be selected by some other criteria. At 540, a threat launch location may be selected. The threat launch location selected at 540 must be mutually consistent with the target selection from 520 and the threat type selected at 530. Specifically, the threat launch location must be selected such that the selected target is within the effective range of the selected threat type. The selections at 520, 530, and 540 may be made in any order or simultaneously, in whole or in part, so long as each selection is consistent with the constraints imposed by any prior selections.

After the threat missile type is selected at 530, a vulnerability threshold function for the selected threat may be estimated at 550. The vulnerability threshold function may define, for a given set of circumstances, the threshold level of the power density of a microwave directed energy beam that is sufficient to cause a MANPADS missile to break lock and stop tracking a target. Actual tests on MANPADS missile have been performed by the Guided Weapons Effectiveness Facility of the United States Air Force. It can be postulated that, for directed energy in general, the vulnerability threshold varies randomly between different missiles of the same type. Also, it can be postulated that, for a given missile, the vulnerability threshold may be a function of aspect angle, or the angle between the directed energy beam and the velocity vector of the missile. Additionally, the log of the vulnerability threshold may be assumed to be a stationary Gaussian process. The test data further shows that the vulnerability thresholds for two angles close together are correlated and that the vulnerability threshold, once defined, may be assumed to be fixed for the life of the threat.

Figure 6:
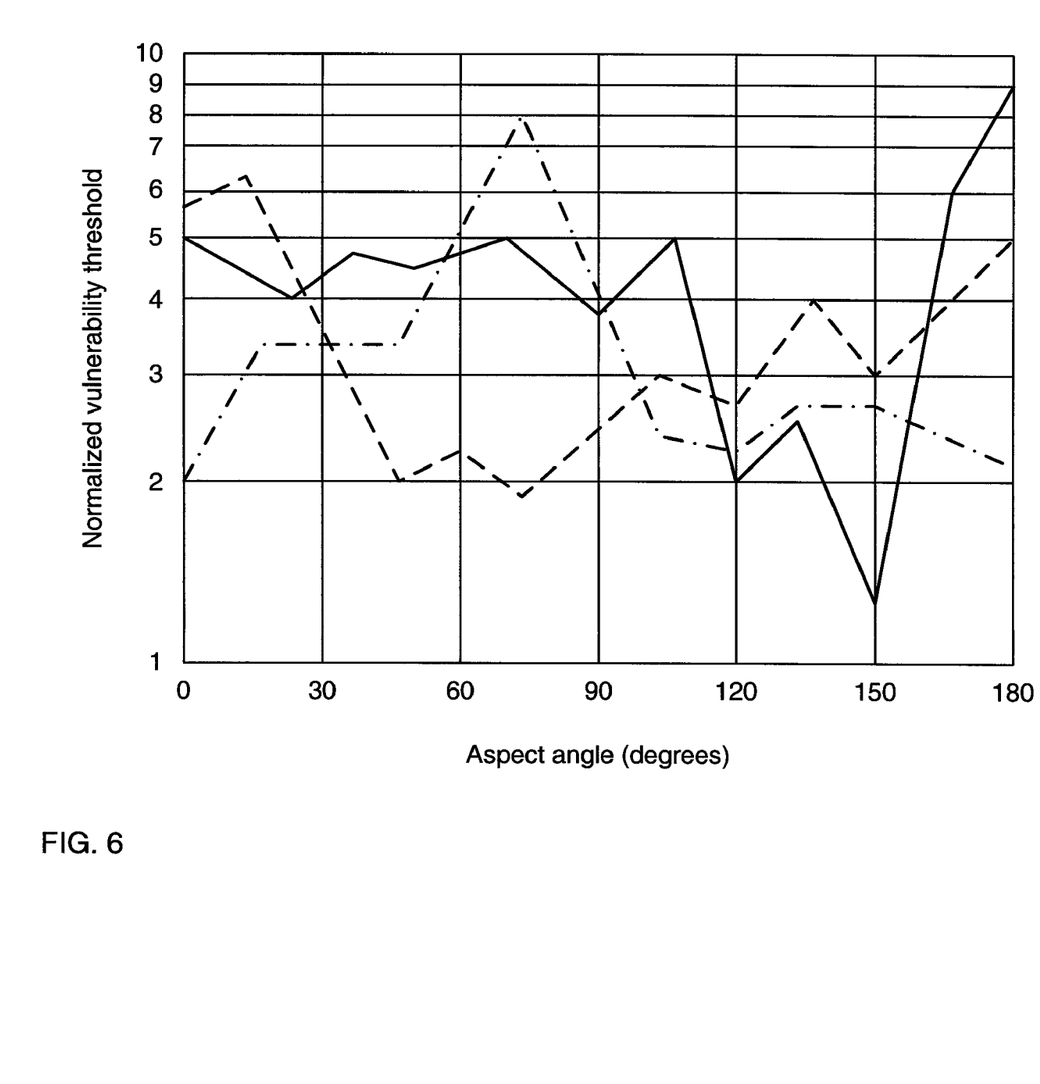
FIG. 6 is a graph showing exemplary MANPADS vulnerability thresholds.

The vulnerability threshold function for a threat may be generated by randomly selecting values for the log of the threshold for a few predetermined aspect angles and linearly interpolating between the selected values for other angles. FIG. 6 graphs the vulnerability thresholds 610/620/630 for three threats generated in this manner, which are mathematically representative, but not the same as experimental threat vulnerability measurements. The vulnerability threshold function may be estimated by randomly selecting values for the log of the threshold for a plurality of angles and then smoothing the function. For example, a moving average window could be applied to smooth the random data. The vulnerability threshold function may be estimated by a Fourier series with randomly-selected coefficients. For example, the vulnerability threshold function $V(\Theta)$ may be estimated as follows:

$$\mathrm{Log}(V(\Theta)) = \mu_E + E_0 + \sqrt{2} \sum_{k=1}^{12} (E_k \cos(k\Theta) + F_k \sin(k\Theta))$$

A simulated engagement may include the launching of two or more threats at the same or different target aircraft. Thus the process from 520 to 550 may be repeated, as indicated by 520-2 to 550-2, for each additional threat.

Defining an engagement scenario may include defining other engagement parameters such as weather and air conditions, and the number and locations of third parties that may be impacted by the directed energy beam.

Figure 7:
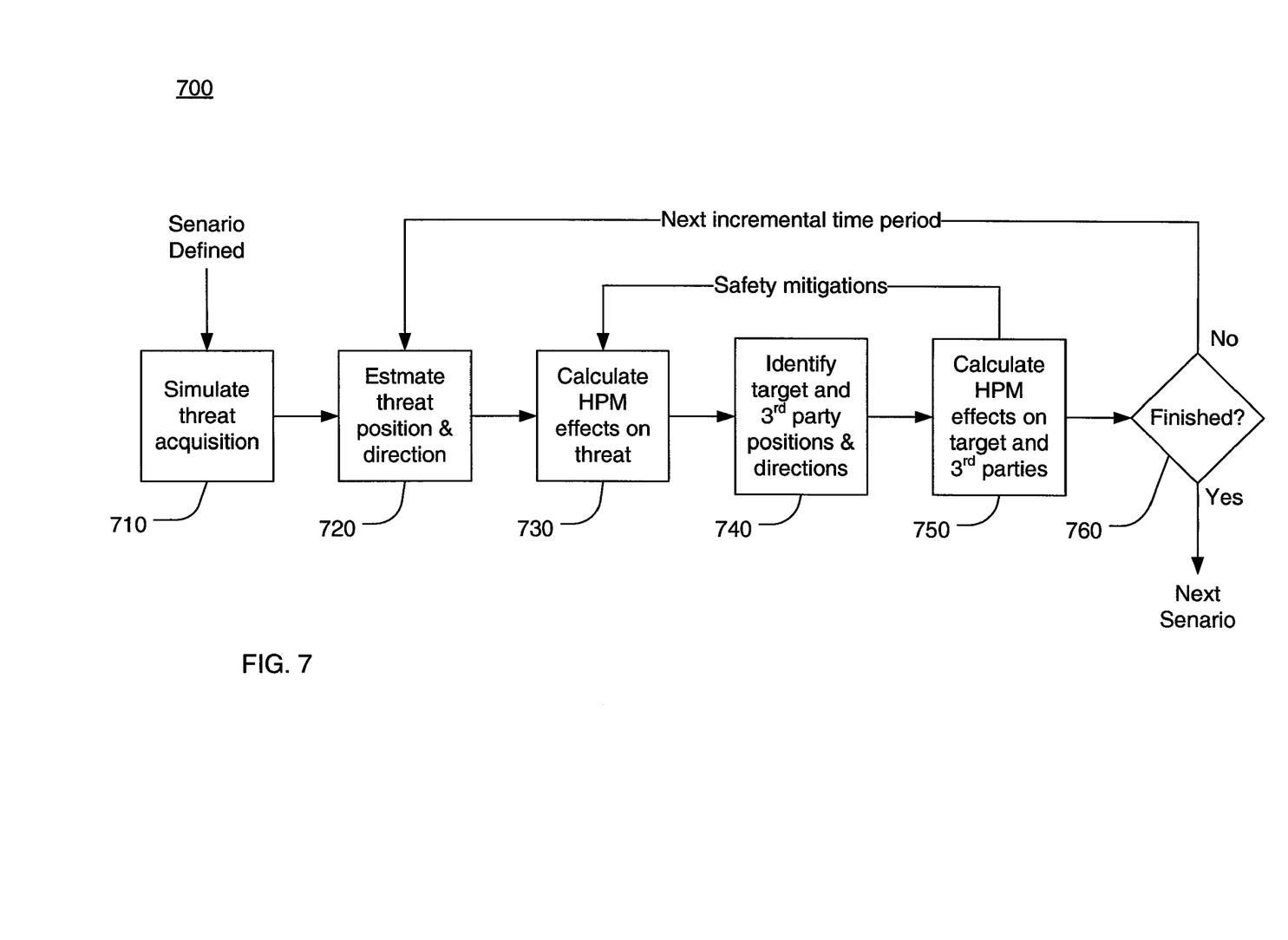
FIG. 7 is a flow chart of a process for simulating an engagement.

After an engagement scenario, including a threat vulnerability threshold function, has been defined, the engagement may be simulated using a process such as the process 700 shown in FIG. 7. The process 700 may begin at 710 by simulating the detection and acquisition of the threat or threats. Known methods for modeling target detection and acquisition may be employed.

At 720, the position and direction, or velocity vector, of the threat may be estimated. At 730, the effect of a hypothetical directed energy beam, pointed at the threat from one of the directed energy sources, may be modeled. The power density of the directed energy beam at the threat may be calculated. The calculation may consider the distance from the directed energy source to the threat, random errors in tracking the threat, random errors in pointing the directed energy beam, the profile or shape of the directed energy beam, assumed atmospheric conditions, and other factors. The effect of the directed energy beam on the threat may be determined using the calculated beam power density at the threat, the aspect angle between the beam and the threat velocity vector, and the previously estimated threat vulnerability function. The process 700 may assume that the threat loses lock on the target, and is thus deterred, if the beam power density at the threat exceeds the vulnerability threshold at the appropriate aspect angle. Alternatively, the threat may be assumed to lose lock if the if the beam power density at the threat exceeds the vulnerability threshold for more than a predetermined time interval, or if the time-integral of the beam power density above the threshold exceeds a predetermined amount.

The effects of a directed energy beam may not be limited to the threat. The directed energy beam may also impact one or more third parties that are in line with the beam or otherwise exposed to the beam energy. The third parties may include aircraft, such as the target aircraft and other aircraft, and entities on the ground such as vehicles, buildings, airport infrastructure components and the like. At 740, the positions of relevant third parties may be identified. The positions of third party aircraft may be calculated based upon an assumed route. Ground-based third parties may be assumed to be moving or stationary for the period of the engagement.

At 750, the effect of the directed energy beam on one or more third parties may be calculated. The directed energy beam power density at the third party may be calculated and compared to a predetermined safety threshold for each third party. The safety threshold for each third party may vary with the type and disposition of the third party. For example, the safety threshold for a flying aircraft may be different than the safety threshold for an aircraft on the ground, which may in turn be different from the safety threshold for an occupied building. In the case of a microwave directed energy beam, the effects on third parties of both the main beam lobe and side lobes may be calculated at 750.

If the calculations at 750 indicate that the beam power density is above the safety threshold for at least one third party, thus placing the third party at risk, the need for a safety mitigation may fed back to 730. Safety mitigations may include, for example, interrupting the directed energy beam, reducing the power of the directed energy beam, re-pointing the directed energy beam, and defocusing or spoiling the directed energy beam.

At 760, a determination may be made if the simulation of the engagement scenario is complete. The simulation may be considered to be complete when the missile threat is judged to lose lock on the target due to the effect of the directed energy beam, when the threat exceeds its operational range (i.e. runs out of fuel), or when the threat is judged to have successfully attacked the target aircraft. In the case where the simulation of the engagement is not complete, the process may continue from 720 for the next incremental time period.

Figure 8:
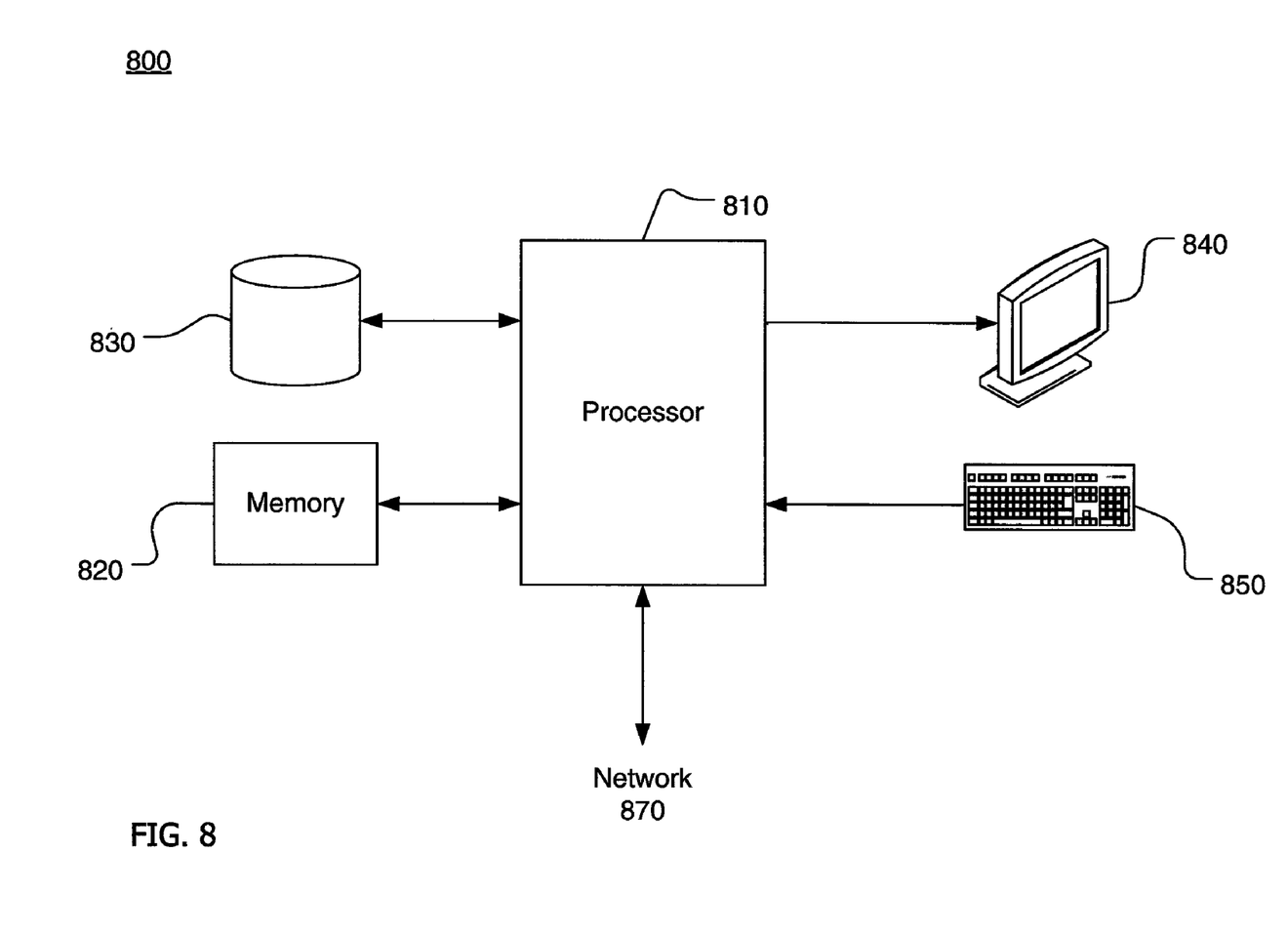
FIG. 8 is a block diagram of a computing device.

The process 700 is exemplary, and the steps may be performed in different order to achieve the same result. Additional and fewer steps may be taken, and the steps as shown may be combined or further refined to achieve the result described herein Description of Apparatus FIG. 8 shows a block diagram of an exemplary computing device 800. A computing device as used herein refers to any device with a processor 810 and a memory 820 that may execute instructions including, but not limited to, personal computers, server computers, main frame computers, computing tablets, work stations, portable computers, and laptop computers. The computing device 800 may also include, or be coupled with, at least one input device 850 and an output device 840. Computing device 800 may also include an interface to a network 870.

The computing device 800 may run an operating system, including, for example, variations of the Linux, Unix, MS-DOS, Microsoft Windows, Palm OS, Solaris, Symbian, and Apple Mac OS X operating systems. The computing device 800 may run one or more application programs. The application programs may be written in C++, Visual Basic, Smalltalk, or other programming language. The application programs may include algorithms and instructions for simulating the deployment of a directed energy weapon system as described herein.

The one or more application programs may be defined by instructions stored on a computer-readable storage media in a storage device 830 included with or otherwise coupled or attached to the computing device 800. These storage media include, for example, magnetic media such as hard disks, floppy disks and tape; optical media such as compact disks (CD-ROM and CD-RW) and digital versatile disks (DVD and DVD-RW); flash memory cards; and other storage media. As used herein, a storage device is a device that allows for reading and/or writing to a storage medium. Storage devices include hard disk drives, CD drives, DVD drives, flash memory devices, and others. The instructions stored on the computer-readable storage media may include instructions that cause the computing device to simulate the deployment of a directed energy weapon system as described herein.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computer implemented method for designing an effective and efficient directed energy weapon system, comprising:
    modeling an environment;
    postulating a directed energy weapon system deployment;
    simulating a capability of the postulated directed energy weapon system deployment to defend a target aircraft against a missile threat within the environment, the simulating includes calculating the effect of the directed energy weapon system on at least one party other than the missile threat, and wherein a safety mitigation is simulated if the effect of the directed energy weapon places a party of the at least one party at risk; and
    iteratively improving the postulated directed energy weapon system deployment based on results from the simulating.

2. The computer implemented method of claim 1, wherein simulating the capability of the postulated directed energy weapon system deployment includes defining a threat vulnerability threshold for the missile threat.

3. A computer implemented method for designing a directed energy weapon system, comprising:
    modeling an environment including possible locations of target aircraft and missile threats;
    postulating a directed energy weapons system deployment to defend the target aircraft against the missile threats;
    defining a plurality of engagement scenarios in which one or more missile threats are launched to attack one or more target aircraft, each engagement scenario including estimating a threat vulnerability threshold function for each missile threat; and simulating the plurality of engagement scenarios, including calculating the effect of the directed energy weapon on at least one party other than the threat, and wherein a safety mitigation is simulated if the effect of the directed energy weapon places a party of the at least one party at risk.

4. The computer implemented method of claim 3, further comprising
revising the postulated directed energy weapons system deployment based on results from simulating the plurality of engagements.

5. The computer implemented method of claim 4, wherein
defining a plurality of engagement scenarios includes selecting a plurality of engagement parameters for each engagement scenario, and
wherein one or more of the engagement parameters are randomly selected.

6. The computer implemented method of claim 5, wherein defining a plurality of engagement parameters further comprises:
selecting a target, a threat type, and a threat launch point for each engagement scenario,
wherein the selected target, selected threat type, and selected threat launch point are mutually consistent.

7. The computer implemented method of claim 4, wherein the at least one party is selected from the group consisting of the target aircraft, another aircraft, and an entity located on the ground.

8. The computer implemented method of claim 4, wherein calculating the effect of the directed energy weapon on a party comprises calculating a directed energy beam power density at the party, and
wherein the party is considered to be at risk if the directed energy beam power density at the party exceeds a predetermined threshold.

9. The computer implemented method of claim 4, wherein the safety mitigation is one or more of interrupting the directed energy beam, reducing the power of the directed energy beam, re-pointing the directed energy beam, and defocusing or spoiling the directed energy beam.

10. The computer implemented method of claim 3, wherein postulating a directed energy weapon system deployment further comprises:
defining locations for a plurality of threat detection and tracking sensors; and
defining locations for one or more directed energy sources.

11. The computer implemented method of claim 10, wherein each of the plurality of threat detection and tracking sensors has a field of regard and an effective range, and
defining locations for a plurality of threat detection and tracking sensors further comprises defining locations such that every possible threat track is within the field of regard and effective range of at least two threat detection and tracking sensors.

12. The computer implemented method of claim 10, wherein
each of the one or more directed energy sources has a field of regard and a main beam effective radiated power, and
defining locations for one or more directed energy sources further comprises defining locations such that every possible threat track is within the field of regard and an effective range of at least one directed energy source.

13. A computing device to simulate a directed energy weapon deployed to defend a target aircraft against a missile threat, the computing device comprising:
a processor;
a memory coupled with the processor; and
a storage medium having instructions stored thereon which when executed cause the computing device to perform actions comprising:
modeling an environment including possible locations of target aircraft and missile threats,
postulating a directed energy weapons system deployment to defend the target aircraft against the missile threats,
defining a plurality of engagement scenarios in which one or more missile threats are launched to attack one or more target aircraft, each engagement scenario including estimating a threat vulnerability threshold function for each missile threat, and
simulating the plurality of engagement scenarios including calculating the effect of the directed energy weapon on at least one party other than the threat, and wherein a safety mitigation is simulated if the effect of the directed energy weapon places a party of the at least one party at risk.

14. A non-transitory storage medium having instructions stored thereon which when executed by a processor will cause the processor to perform actions comprising:
modeling an environment including possible locations of target aircraft and missile threats;
postulating a directed energy weapons system deployment to defend the target aircraft against the missile threats;
defining a plurality of engagement scenarios in which one or more missile threats are launched to attack one or more target aircraft, each engagement scenario including estimating a threat vulnerability threshold function for each missile threat; and
simulating the plurality of engagement scenarios including calculating the effect of the directed energy weapon on at least one party other than the threat, and wherein a safety mitigation is simulated if the effect of the directed energy weapon places a party of the at least one party at risk.

15. A computer implemented method for simulating a directed energy weapon deployed to defend a target aircraft against a missile threat, comprising:
developing an environment defining possible locations of target aircraft and missile threats;
postulating a directed energy weapons system deployment to defend the target aircraft against the missile threats;
defining a plurality of engagement scenarios in which one or more missile threats are launched to attack one or more target aircraft; and
simulating the plurality of engagement scenarios including calculating an effect of the directed energy weapon on a party other than the one or more missile threats, wherein a safety mitigation is simulated if the effect of the directed energy weapon places a party of the at least one party at risk.

16. The computer implemented method of claim 15, wherein the safety mitigation is one or more of interrupting the directed energy beam, reducing the power of the directed energy beam, re-pointing the directed energy beam, and defocusing or spoiling the directed energy beam.

17. The computer implemented method of claim 15, wherein the party is selected from the group consisting of the target aircraft, another aircraft, and an entity located on the ground.

18. The computer implemented method of claim 15, wherein calculating the effect of the directed energy weapon on a party comprises calculating a directed energy beam power density at the party, and
wherein the party is considered to be at risk if the directed energy beam power density at the party exceeds a predetermined threshold.

* * * * *

UNITED STATES PATENT AND TRADEMARK OFFICE
CERTIFICATE OF CORRECTION

PATENT NO. : 8,285,533 B2  
APPLICATION NO. : 12/124780  
DATED : October 9, 2012  
INVENTOR(S) : Ahrens et al.

Page 1 of 1

It is certified that error appears in the above-identified patent and that said Letters Patent is hereby corrected as shown below:

In the drawings, on sheet 2 of 11, figure 2, reference numeral 220, delete "senario" and insert --scenario--, therefor On sheet 10 of 11, figure 7, reference numeral 720, delete "Estmate" and insert --Estimate--, therefor In column 6, line 10, before "A stimulated" insert --where $\mu E$ = the mean of the log vulnerability threshold function;
E0, Ek, Fk = independent zero-mean Gaussian random variables, where the variance of each of E0, Ek, Fk is selected based on measured vulnerability threshold data.--, therefor In column 6, line 45, before "beam", delete "if the", therefor In column 9, line 8, in Claim 4, after "comprising", insert --:--, therefor In column 9, line 26, after "herein", insert --.--, therefor Signed and Sealed this  
Twelfth Day of March, 2013

Teresa Stanek Rea  
*Acting Director of the United States Patent and Trademark Office*